US 9,247,284 B1

(12) United States Patent
Hesselink

(10) Patent No.: US 9,247,284 B1
(45) Date of Patent: *Jan. 26, 2016

(54) PORTABLE CONTENT CONTAINER DISPLAYING A/V FILES IN RESPONSE TO A COMMAND RECEIVED FROM A CONSUMER DEVICE

(71) Applicant: Western Digital Technologies, Inc., Irvine, CA (US)

(72) Inventor: Lambertus Hesselink, Portola Valley, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/511,951

(22) Filed: Oct. 10, 2014

Related U.S. Application Data

(63) Continuation of application No. 14/014,025, filed on Aug. 29, 2013, now Pat. No. 8,861,941, which is a continuation of application No. 12/646,927, filed on Dec. 23, 2009, now Pat. No. 8,526,798.

(51) Int. Cl.
*H04N 5/93* (2006.01)
*H04N 5/765* (2006.01)
*H04N 5/775* (2006.01)
*H04N 5/76* (2006.01)
*H04N 21/432* (2011.01)
*H04N 21/6587* (2011.01)
*H04N 21/472* (2011.01)

(52) U.S. Cl.
CPC ........... *H04N 21/4325* (2013.01); *H04N 5/765* (2013.01); *H04N 21/47217* (2013.01); *H04N 21/6587* (2013.01)

(58) Field of Classification Search
None
See application file for complete search history.

(56) References Cited

U.S. PATENT DOCUMENTS

| 5,649,185 | A | 7/1997 | Antognini et al. |
| 6,499,054 | B1 | 12/2002 | Hesselink et al. |
| 6,549,490 | B1 | 4/2003 | Howarth |
| 6,732,158 | B1 | 5/2004 | Hesselink et al. |
| 6,799,274 | B1 | 9/2004 | Hamlin |

(Continued)

FOREIGN PATENT DOCUMENTS

CN 101569184 10/2009

OTHER PUBLICATIONS

Chinese Office Action dated Nov. 17, 2014 from Chinese Application Serial No. 201080064663.X, 31 pages.

(Continued)

*Primary Examiner* — Heather Jones

(57) ABSTRACT

In an embodiment, a media playback device is disclosed comprising a first interface configured to communicate with a media output device, a second interface configured to communicate with a data storage device, and control circuitry. In one embodiment, the control circuitry is configured to receive information identifying media files from a data storage device (DSD) over the second interface; generate a user interface for the media output device, the user interface identifying at least one of the media files; transmit the user interface to the media output device over the first interface; receive a play command from a user to play a selected media file; and transmit the play command over the second interface to the DSD to stream the selected media file on the media output device, wherein the media stream from the DSD bypasses the media playback device.

20 Claims, 7 Drawing Sheets

(56) References Cited

U.S. PATENT DOCUMENTS

| | | |
|---|---|---|
| 6,853,731 B1 | 2/2005 | Boyle et al. |
| 6,950,441 B1 | 9/2005 | Kaczmarczyk et al. |
| 6,978,348 B2 | 12/2005 | Belknap et al. |
| 7,027,716 B1 | 4/2006 | Boyle et al. |
| 7,106,947 B2 | 9/2006 | Boyle et al. |
| 7,120,692 B2 | 10/2006 | Hesselink et al. |
| 7,292,775 B1 | 11/2007 | Boyle et al. |
| 7,426,329 B2 | 9/2008 | Calhoon et al. |
| 7,444,388 B1 | 10/2008 | Svendsen |
| 7,454,443 B2 | 11/2008 | Ram et al. |
| 7,467,187 B2 | 12/2008 | Hesselink et al. |
| 7,487,312 B2 | 2/2009 | Paveza et al. |
| 7,499,938 B2 | 3/2009 | Collart |
| 7,546,353 B2 | 6/2009 | Hesselink et al. |
| 7,577,677 B2 | 8/2009 | Collart |
| 7,587,446 B1 | 9/2009 | Onyon et al. |
| 7,587,467 B2 | 9/2009 | Hesselink et al. |
| 7,600,036 B2 | 10/2009 | Hesselink et al. |
| 7,653,761 B2 | 1/2010 | Juster et al. |
| 7,730,132 B2 | 6/2010 | Ludwig et al. |
| 7,735,145 B2 | 6/2010 | Kuehnel et al. |
| 7,770,025 B2 | 8/2010 | Bobrow |
| 7,788,404 B2 | 8/2010 | Hesselink et al. |
| 7,814,554 B1 | 10/2010 | Ragner |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 8,861,941 B1 | 10/2014 | Hesselink |
| 2001/0029583 A1 | 10/2001 | Palatov et al. |
| 2001/0042170 A1 | 11/2001 | Belknap et al. |
| 2001/0056541 A1 | 12/2001 | Matsuzaki et al. |
| 2002/0104019 A1 | 8/2002 | Chatani et al. |
| 2002/0166035 A1 | 11/2002 | Belknap et al. |
| 2005/0120380 A1* | 6/2005 | Wolfe .......................... 725/100 |
| 2005/0144195 A1 | 6/2005 | Hesselink et al. |
| 2005/0144200 A1 | 6/2005 | Hesselink et al. |
| 2005/0210101 A1 | 9/2005 | Janik |
| 2005/0281470 A1 | 12/2005 | Adams |
| 2006/0245725 A1* | 11/2006 | Lim ................................ 386/95 |
| 2007/0055982 A1 | 3/2007 | Spilo |
| 2007/0056013 A1 | 3/2007 | Duncan |
| 2007/0174140 A1 | 7/2007 | Noonan et al. |
| 2007/0250193 A1 | 10/2007 | Raines et al. |
| 2008/0152305 A1 | 6/2008 | Ziegler |
| 2008/0199006 A1 | 8/2008 | Gandolph et al. |
| 2008/0249874 A1 | 10/2008 | Seo |
| 2009/0094160 A1 | 4/2009 | Webster et al. |
| 2009/0169020 A1 | 7/2009 | Sakthikumar et al. |
| 2009/0249420 A1 | 10/2009 | Kim et al. |
| 2009/0282462 A1 | 11/2009 | Skaria et al. |
| 2010/0011351 A1 | 1/2010 | Tsvi et al. |
| 2010/0030867 A1 | 2/2010 | Yao |
| 2010/0146269 A1 | 6/2010 | Baskaran |
| 2010/0228989 A1 | 9/2010 | Neystadt et al. |
| 2010/0318417 A1 | 12/2010 | Brisebois et al. |
| 2012/0023139 A1 | 1/2012 | Greeley |
| 2012/0036041 A1 | 2/2012 | Hesselink |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0169921 A1 | 6/2014 | Carey |
| 2014/0173215 A1 | 6/2014 | Lin et al. |

OTHER PUBLICATIONS

Quantum Data, Inc., "Designing CEC into your next HDMI Product", http://www.hdmi.org/pdf/whitepaper/DesigningCECintoYourNextHDMIProduct.pdf.

Search Report and Written Opinion dated Feb. 14, 2011 in international application No. PCT/US2010/060890, 10 pages.

"Technological Protection Systems for Digitized Copyrighted Works: A Report to Congress," TEACH ACT Report by USPTO, May 20, 2003.

Int'l Preliminary Report dated Jul. 5, 2012 in international application No. PCT/US2010/060890, 9 pages.

Office Action dated Mar. 1, 2012 from U.S. Appl. No. 12/646,927, 28 pages.

Final Office Action dated Aug. 29, 2012 from U.S. Appl. No. 12/646,927, 28 pages.

Office Action dated Nov. 7, 2012 from U.S. Appl. No. 12/646,927, 15 pages.

Final Office Action dated Feb. 28, 2013 from U.S. Appl. No. 12/646,927, 23 pages.

Notice of Allowance dated May 8, 2013 from U.S. Appl. No. 12/646,927, 11 pages.

Office Action dated Dec. 6, 2013 from U.S. Appl. No. 14/014,025, 15 pages.

Notice of Allowance dated Jun. 6, 2014 from U.S. Appl. No. 14/014,025, 14 pages.

Lambertus Hesselink, et al., U.S. Appl. No. 12/916,342, filed Oct. 29, 2010, 40 pages.

European Office Action dated Oct. 9, 2013 from European Application Serial No. 10840011.0, 12 pages.

* cited by examiner

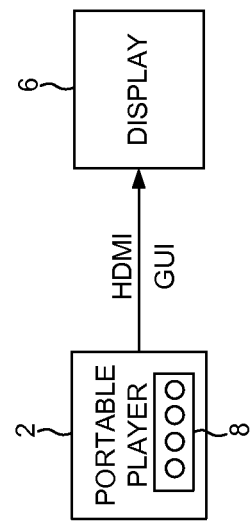
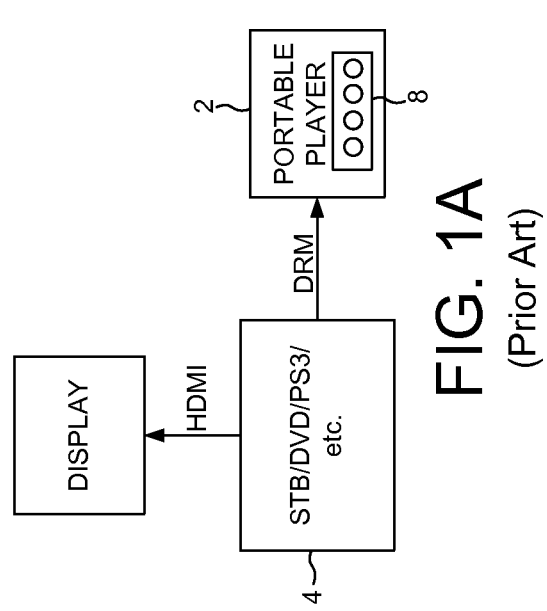
FIG. 1B
(Prior Art)
FIG. 1A
(Prior Art)

PORTABLE CONTENT CONTAINER DISPLAYING A/V FILES IN RESPONSE TO A COMMAND RECEIVED FROM A CONSUMER DEVICE

CROSS-REFERENCE TO RELATED APPLICATIONS

This application is a continuation of U.S. patent application Ser. No. 14/014,025, filed on Aug. 29, 2013 entitled "PORTABLE CONTENT CONTAINER DISPLAYING A/V FILES IN RESPONSE TO A COMMAND RECEIVED FROM A CONSUMER DEVICE" and is a continuation of U.S. patent application Ser. No. 12/646,927, filed on Dec. 23, 2009, entitled "PORTABLE CONTENT CONTAINER DISPLAYING A/V FILES IN RESPONSE TO A COMMAND RECEIVED FROM A CONSUMER DEVICE," which issued as U.S. Pat. No. 8,526,798, all of which are hereby incorporated by reference in their entirety.

BACKGROUND

FIG. 1A shows a prior art portable player 2 that receives audio/video (A/V) files from a consumer device 4 (e.g., STB) under a digital rights management (DRM) scheme (e.g., Microsoft PlayReady). The portable player 2 can then be transported and connected to any display device 6 (FIG. 1B) and the A/V files displayed without the display device needing a DRM license. This is because the content is streamed from the portable player under an un-recordable protocol (e.g., analog or High-Definition Multimedia Interface (HDMI)). The portable player 2 renders a graphical user interface (GUI) on the display device 6 allowing the user to select and play an A/V file. The portable player 2 may comprise a control panel 8 (e.g., push buttons) for receiving user input, or the portable player 2 may comprise an interface (e.g., infrared) for receiving user commands via a remote control.

BRIEF DESCRIPTION OF THE DRAWINGS

FIG. 1A illustrates a prior art system wherein a consumer device transfers A/V files to a portable player using a DRM protocol.

FIG. 1B illustrates a prior art portable player that displays a GUI on a monitor for a user to select and play one of the A/V files.

DETAILED DESCRIPTION OF EMBODIMENTS OF THE INVENTION

Figure 2B:
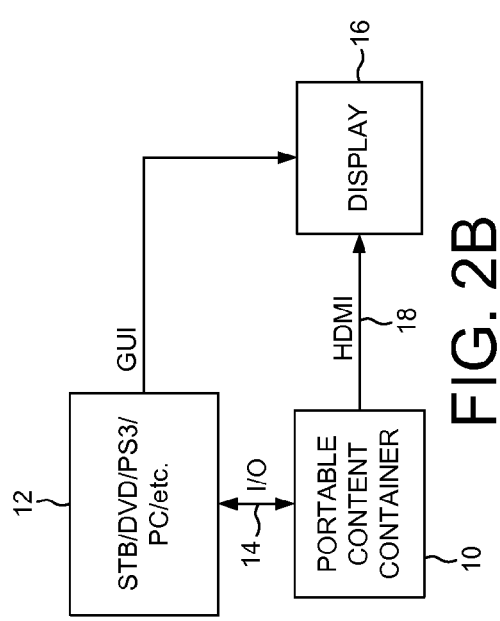
FIG. 2B illustrates an embodiment of the present invention wherein the PCC transmits file directory information to a consumer device that displays a GUI with a list of the A/V files, and when a user selects one of the A/V files, the PCC decodes and displays the A/V file.
Figure 2C:
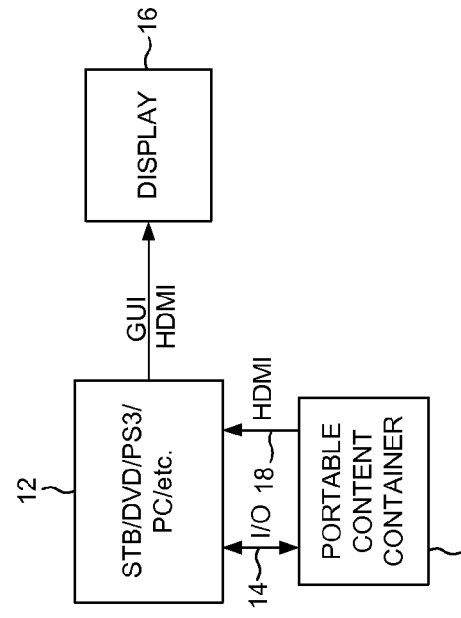
FIG. 2C illustrates an embodiment of the present invention wherein an HDMI stream is multiplexed between the consumer device and the PCC.
Figure 2A:
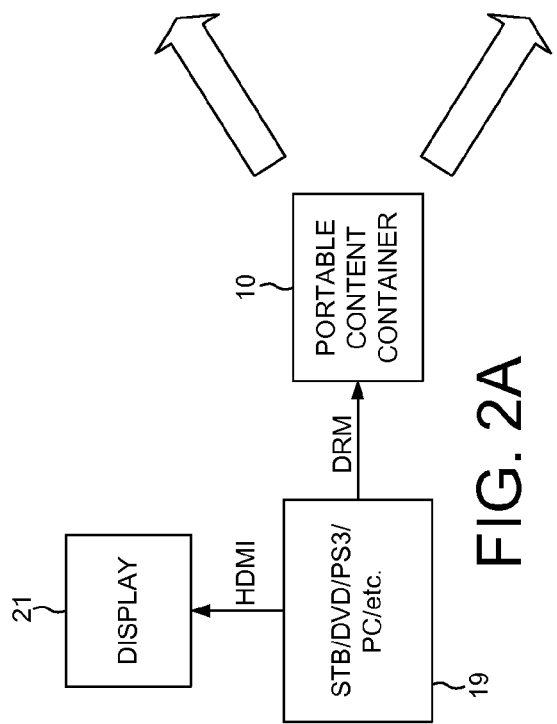
FIG. 2A illustrates an embodiment of the present invention wherein A/V files are transmitted to a portable content container (PCC) using a DRM protocol.

FIGS. 2A-2C illustrate a portable content container (PCC) 10, according to an embodiment of the present invention, comprising a decoder for decoding an audio video (A/V) file into an A/V stream. File directory information identifying one or more A/V files is transmitted to a consumer device 12 over a first interface 14. The PCC 10 receives a display command from the consumer device 12 to display a selected one of the A/V files on a display device 16. The selected A/V file is decoded into an A/V stream transmitted over a second interface 18 to the display device 16 in response to the display command (displayed directly or through the consumer device 12, for example).

In the embodiment of FIG. 2A, the PCC 10 receives A/V files from a first consumer device 19 using a suitable DRM protocol that licenses the PCC 10 to decode the A/V files. The A/V files may be received from the first consumer device 19 over the first interface 14, or over a different interface. The PCC 10 may receive the A/V files from any suitable consumer device 19 such as a set-top box (STB) that may receive A/V files over a cable, or a personal computer (PC) that may receive A/V files over the Internet. When a user is at a first location (e.g., at home), the user may select and play the A/V files on a display device 21 by controlling the consumer device 19. For example, the display device 21 may be a TV monitor connected to a STB, or a monitor of a PC. There may be times when the user would like to play the A/V files at a remote location, for example, when the user is traveling or when the user wants to play the A/V files at a friend's house. To enable this portability the user transfers the A/V files to the PCC 10 (e.g., using a DRM protocol) which is then reconnected to another consumer device 12 at the remote location. The remote consumer device 12 displays a GUI including the names of the A/V files stored on the PCC 10. For example, if the remote consumer device 12 is a STB, a list of A/V files stored on the PCC 10 may be displayed in a program guide. When the user selects one of the A/V files from the GUI, the remote consumer device 12 commands the PCC 10 to decode and display the selected A/V file on the display device 16.

The remote consumer device 12 does not need a DRM license because it does not have access to the A/V files stored on the PCC 10 (i.e., the remote consumer device 12 cannot record or otherwise manipulate the A/V files). Consequently, a user can transport and connect the PCC 10 to any compatible consumer device 12 anywhere in the world and play copyrighted A/V files without the consumer device 12 needing a DRM license. The A/V files remain protected from unauthorized copying by effectively shielding the A/V files from the consumer device 12. In addition, controlling the PCC 10 from the remote consumer device 12 simplifies operating aspects for the end users, such as using a single remote control to control both devices, as well as using a GUI already familiar to the end users. For example, a user may transport the PCC 10 to a remote STB having a program guide already familiar to the user, and immediately begin controlling both devices using the remote control of the remote STB.

In an example application, the PCC 10 may be considered as an extended storage device for a Digital Video Recorder (DVR) integrated within a STB, except that neither the DVR or STB directly access (or decode) the A/V files stored on the PCC 10. When the STB and/or DVR discovers an external PCC 10, the names of the A/V files on the PCC 10 are merely incorporated into the play list of the DVR GUI such as, for example, a DVR's "recorded programs" or "MyDVR" list. When an end user selects an A/V file stored on the external PCC 10, the STB/DVR commands the PCC 10 to decode and play the selected A/V file on the display device 16.

A remote consumer device 12 may receive the file directory information from the PCC 10 using any suitable communication protocol. In one embodiment, the PCC 10 may comprise a suitable file system typically employed in a computer operating system, such as Microsoft Windows, Mac OS, Linux, UNIX, or the like. The remote consumer device 12 may communicate with the PCC 10 using a conventional disk drive communication protocol (e.g., the ATA protocol) in order to read file directory information (e.g., a File Allocation Table (FAT)). In one embodiment, the PCC 10 ignores or otherwise disables access to the A/V files themselves by intercepting and ignoring ATA commands intended to access the A/V files.

In one embodiment, the PCC 10 may comprise a local memory in the form of a non-volatile storage device (e.g., a disk drive or solid state drive, combinations of the same, and the like) for storing the A/V files. In order to protect against an end user removing the storage device and connecting it to an unauthorized host (e.g., a personal computer), the PCC 10 may store the A/V files in an encrypted form using a secret key (e.g., using a key embedded in an integrated circuit of the PCC 10). Any suitable cryptographic key and encryption algorithm may be employed in the embodiments of the present invention, such as using a unique identifier such as a serial number of the PCC 10 to generate a suitable message authentication code (MAC). In this manner, if the storage device is removed from the PCC 10, or if the A/V files are otherwise extracted illegally from the PCC 10, the A/V files will remain inaccessible to an unauthorized host.

In one embodiment, the PCC 10 transmits the decoded A/V stream to the display device 16 over an interface comprising an "un-recordable" protocol, such as the High-Definition Multimedia Interface (HDMI). An HDMI interface implements an "un-recordable" protocol by enforcing manufacturing standards that ensure consumer devices are HDMI compliant. A consumer device is considered HDMI compliant (and allowed to use the HDMI trademark) only if it is manufactured in a manner that ensures the A/V stream transmitted over the HDMI interface cannot be recorded. Accordingly, there are no (compliant) consumer devices on the market with an HDMI input that are capable of recording the A/V stream received over the HDMI input. Examples of HDMI compliant consumer devices are display devices (e.g., TV monitors) that typically have a number of HDMI inputs.

FIG. 2B shows an embodiment of the present invention wherein the PCC 10 transmits the file directory information for the A/V files over a first interface 14 (e.g., a peripheral interface such as the Universal Serial Bus (USB)), and transmits the decoded A/V stream over a second interface 18 (e.g., HDMI) to the display device 16. The first interface 14 may implement any suitable protocol, and may be a wired interface or a wireless interface (e.g., Bluetooth, WiFi, or WiMAX). For example, a user may connect the PCC 10 to the remote consumer device 12 through the first interface 14 (wired or wirelessly), and then connect the PCC 10 to the display device 16 through the second interface 18 (e.g., using an HDMI cable). The remote consumer device 12 may be plugged into a first input port of the display device 16 (e.g., a first HDMI input), and the PCC 10 may be plugged into a second input port of the display device 16 (e.g., a second HDMI input). In one embodiment, the display device 16 is controlled by the user (e.g., using a remote control or push buttons of a control panel) to select which input is displayed on the screen. For example, the user may first select the first input port so that the GUI of the consumer device 12 is displayed on the screen. When the user selects one of the A/V files to play from the PCC 10, a message is displayed in the GUI to change the input of the display device 16 to the PCC 10 input. In an alternative embodiment, when a command to display an A/V file is received, the consumer device 12 may command the display device 16 to change its input to the PCC 10. For example, a user may program the consumer device 12 with the input port that the PCC 10 is using so that the consumer device 12 can command the display device 16 to switch to the appropriate input. Any suitable technique may be employed to change the input, wherein in one embodiment the remote consumer device 12 sends a command similar to using an "input" button on a remote control or control panel of the display device 16.

An alternative embodiment of the present invention is illustrated in FIG. 2C wherein the second interface 18 for streaming the A/V files to the display device 16 from the PCC 10 (e.g., HDMI interface) is routed through the remote consumer device 12. This embodiment enables the remote consumer device 12 to select between its own output or the output of the PCC 10 to be displayed on the display device 16. When a user selects an A/V file to play from the PCC 10, the remote consumer device 12 automatically switches to the output of the PCC 10, in an embodiment, rather than, for example, having the user perform the switching.

Figure 3A:
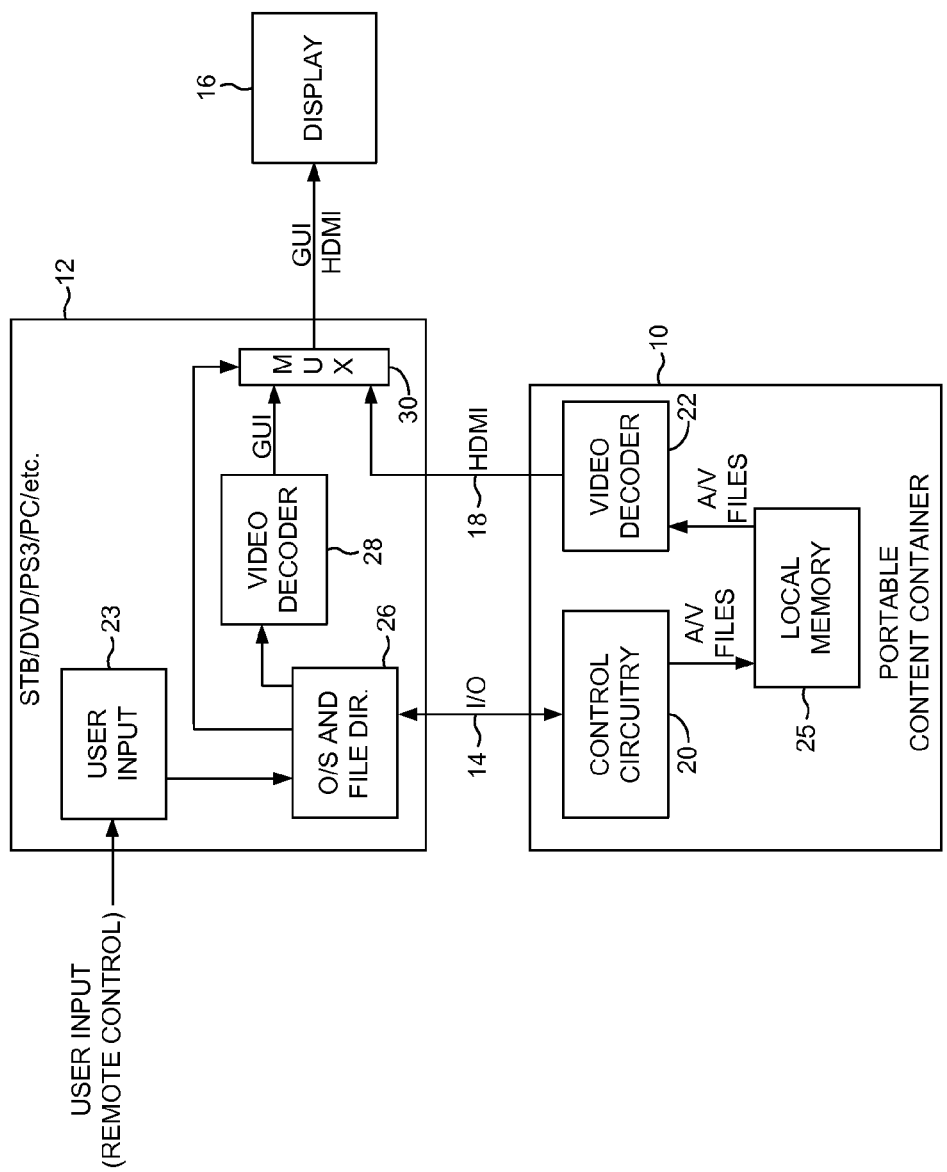
FIG. 3A illustrates an embodiment of the present invention wherein a consumer device receives file directory information from a PCC over a first interface, and receives a selected video stream from the PCC over a second interface using an un-recordable protocol.

Further details of this embodiment are illustrated in FIG. 3A wherein the PCC 10 comprises control circuitry 20 including a local memory 25 for storing an operating system, file directory information, and the A/V files. Any suitable local memory 25 may be employed in the embodiments of the present invention, such as a disk drive comprising a magnetic disk, or a solid state drive comprising semiconductor memories (e.g., Flash). Other embodiments may employ a hybrid disk drive—incorporating both magnetic disk and solid state memory—that, in an embodiment, employs semiconductor memory (e.g., Flash) for caching the A/V files to ensure adequate performance.

The file directory information stored in the local memory 25 is provided to the remote consumer device 12 over the first interface 14, and a decoder 22 decodes the A/V files stored in the local memory 25 for transmission over the second interface 18. The remote consumer device 12 comprises a user input interface 23, such as, for example, a remote control infrared or radio frequency receiver or push buttons or a smartphone communicating (wired or wirelessly) with the consumer device 12 over a local area network or over a wide area network (e.g., the Internet). The remote consumer device 12 further comprises control circuitry 26 for running an operating system that interfaces with the PCC 10 over the first interface 14 and for controlling the operation of the remote consumer device 12. The remote consumer device 12 further comprises a decoder 28 for decoding A/V files stored locally as well as for generating the GUI. A switching circuit 30 (e.g., a multiplexer) is configured by the remote consumer device 12 to select between it's own output and the A/V stream output by the PCC 10 for display on the display device 16. In this embodiment, the control circuitry 26 of the remote consumer device 12 does not have access to the A/V files stored on the PCC 10, that is, cannot read or access the A/V files over either the first interface 14 or the second interface 18. Accordingly, the remote consumer device 12 does not need a DRM license to access the A/V files but instead merely commands the PCC 10 to stream a user selected A/V file to the display device 16.

Figure 3B:
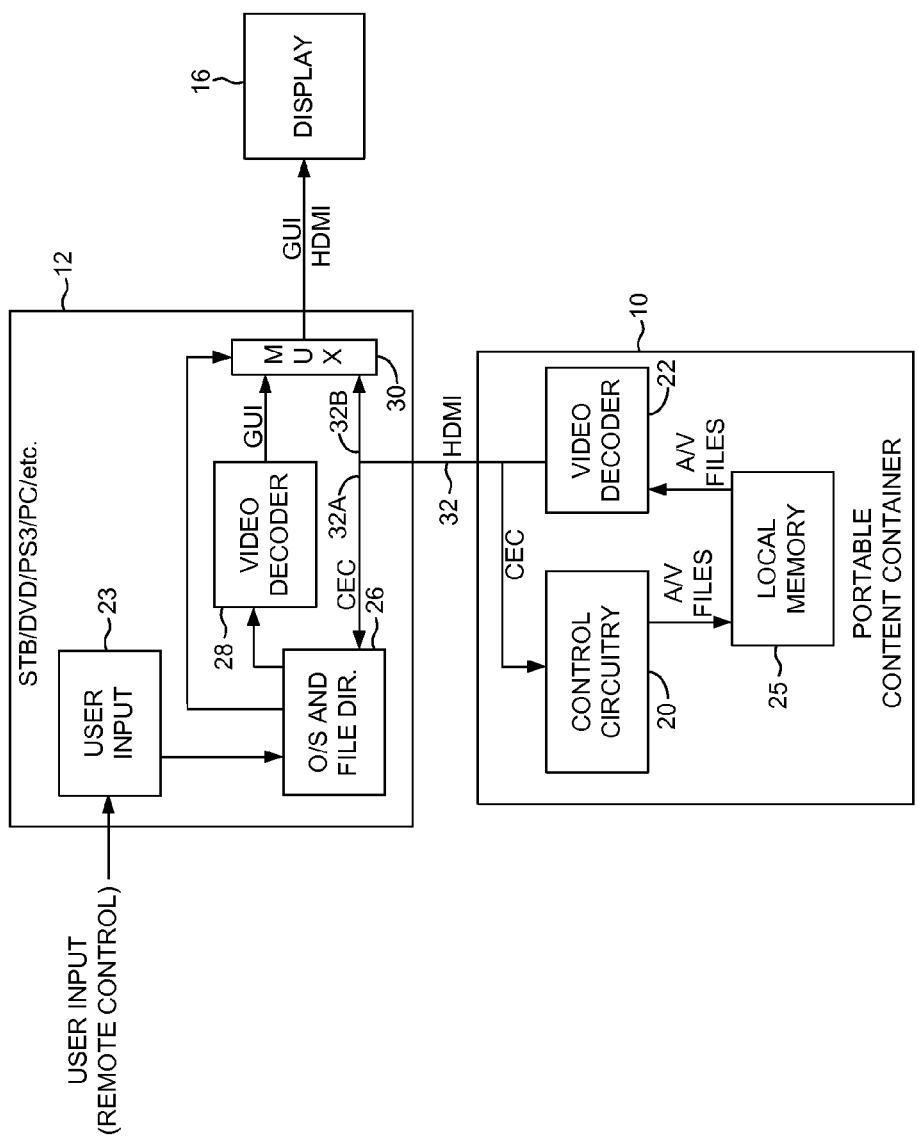
FIG. 3B illustrates an embodiment of the present invention wherein a consumer device receives file directory information from a PCC over the Consumer Electronics Control (CEC) of an HDMI interface.

FIG. 3B illustrates an embodiment of the present invention wherein the first interface 14 and second interface 18 of FIG. 2B are integrated into a common interface 32, such as, for example an HDMI interface. In this embodiment, the first interface 14 for transmitting the file directory information comprises the Consumer Electronics Control (CEC) 32A of the common interface 32. The CEC bus is a one-wire "party line" that connects up to ten devices through, for example, standard HDMI cabling. The CEC protocol includes automatic mechanisms for physical address (topology) discovery, (product type based) logical addressing, arbitration, retransmission, broadcasting, and routing control. In one embodiment, the control circuitry 26 of the remote consumer device 12 has access only to the CEC bus and not to the interface lines 32B that carry the A/V stream. This embodiment enables the remote consumer device 12 to control the PCC 10 over a standard HDMI interface, thereby avoiding the additional expense of a separate peripheral interface to communicate with the PCC 10.

The second interface 18 for transmitting the A/V files may be a wired or wireless interface. For example, in one embodiment the second interface 18 may comprise a wireless HDMI interface which is currently under development. Similar to a wired HDMI interface, the wireless HDMI interface is implemented in a manner that ensures the A/V stream is un-recordable by the remote consumer device 12. For example, the remote consumer device 12 may be manufactured without a suitable HDMI decoder for decoding an HDMI signal (A/V signal) regardless as to whether the HDMI interface is implemented wired or wirelessly.

In an example application where the first and second interfaces comprise a wireless interface, the PCC may be implemented as a small battery powered device (e.g., in a cell phone) that an end user may store in a shirt pocket, briefcase, handbag, etc. While traveling on a plane, the end user may be working on a laptop computer wherein an icon representing the PCC is automatically displayed on the desktop. The end user may access the PCC using a file manger similar to accessing an internal disk drive (or solid state drive), wherein a list of the A/V files may be displayed in a folder. The end user may select one of the A/V files to play on the monitor of the laptop computer, except that the PCC performs the decoding and streaming of the A/V file to the monitor. The operating system of the laptop computer would not have access to the A/V files recorded on the PCC under the protocol for implementing the un-recordable stream (e.g., HDMI stream).

Figure 4:
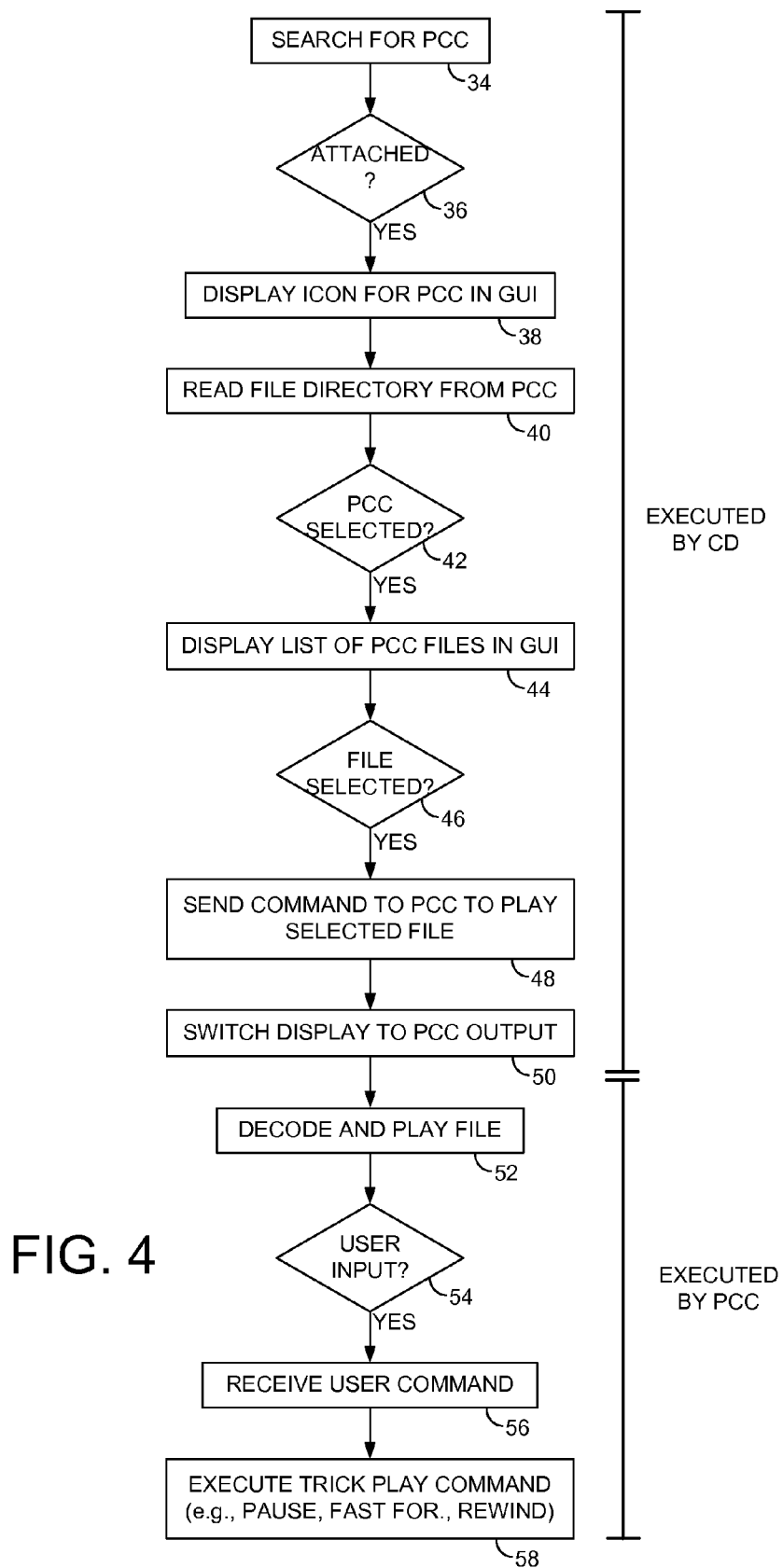
FIG. 4 is a flow diagram according to an embodiment of the present invention wherein a consumer device displays an icon in a GUI representing a PCC, and when the user selects the icon, a list of A/V files stored on the PCC is displayed in the GUI.

FIG. 4 is a flow diagram according to an embodiment of the present invention wherein the top portion is executed by the remote consumer device 12 and the bottom portion is executed by the PCC 10. The remote consumer device may periodically search for attached PCCs (block 34), or the remote consumer device may be notified when a PCC is present. When a PCC is discovered (block 36), an icon is displayed in the GUI of the remote consumer device representing the PCC (block 38). The remote consumer device reads the file directory information from the PCC (block 40), and when the end user selects the PCC from the GUI (block 42), a list of file names representing the A/V files on the PCC are displayed in the GUI (block 44). When the end user selects one of the A/V files on the PCC (block 46), the remote consumer device transmits a command to the PCC to begin decoding the selected A/V file into an A/V stream transmitted to the display (block 48), and the remote consumer device automatically configures a switch so that the output of the PCC is displayed on the display device (block 50). In another embodiment, the contents of the PCC may be read as an extension of the remote consumer device's file directory and shown to a user seamlessly as if the contents were recorded programs on the remote consumer device itself.

While the PCC is decoding and playing the A/V file (block 52), the remote consumer device may receive a user command related to the content being displayed (block 54). For example, the end user may generate a command to perform a trick-play function (e.g., pause, fast-forward, rewind, etc.) wherein this user command is transmitted to the PCC over the first interface (block 56). The PCC responds to the user command by modifying the decoding process to execute the desired trick-play feature (block 58).

In one embodiment, the end user may command the remote consumer device to stop playing an A/V file from the PCC (e.g., by pressing a "stop" button or a "program guide" button on a remote control). In response, the remote consumer device may command the PCC to stop playing the current A/V file and switch the input of the display device to the output of the remote consumer device so that the GUI can be displayed.

To enhance portability, the PCC 10 may comprise a chargeable battery as a power source when connected to the remote consumer device 12. Alternatively, the PCC 10 may derive power from the remote consumer device 12 or display device 16 over a power sourcing interface (e.g., the USB interface). Accordingly, in this embodiment the PCC 10 need not be plugged into an outlet for power, thereby further enhancing the portability of the PCC 10.

In one embodiment, the PCC 10 may allow access to public A/V files and/or other user files so that the PCC 10 may be used as a conventional external storage device (e.g., for a desktop or laptop computer). Any suitable technique may be employed to access unprotected and protected files from the local memory 25 of the PCC. In one embodiment, the protected A/V files may be transferred to the PCC 10 using a dedicated communication protocol so that the A/V files are stored in a protected manner. For example, in one embodiment the control circuitry 20 of the PCC 10 may create a first partition in the local memory 25 for storing unprotected files and a second partition for storing protected A/V files. The second, protected partition may be accessed using a password or key so as to prevent unauthorized access. In another embodiment, each protected A/V file may be encoded using an encryption key so that the protected A/V files may be stored anywhere within the local memory 25.

Figure 5A:
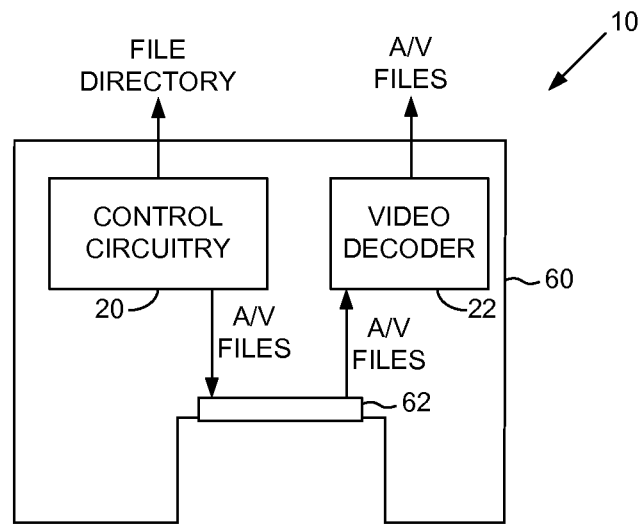
FIG. 5A shows an embodiment of the present invention wherein the PCC comprises a dock for receiving a removable storage device (e.g., a Flash card or hard drive).
Figure 5B:
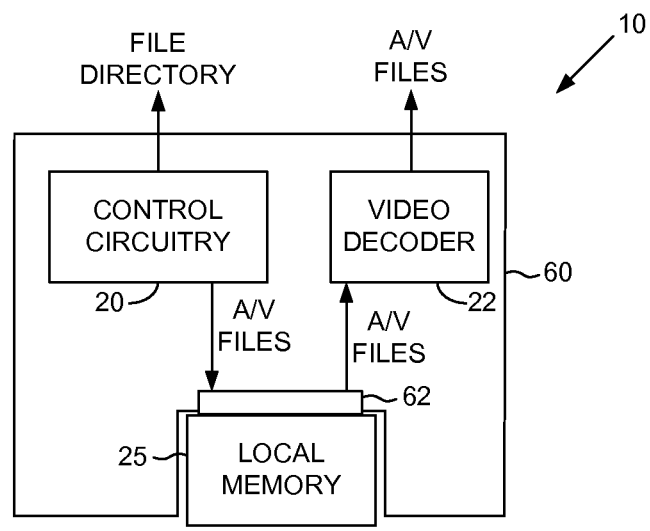
FIG. 5B shows a storage device plugged into the dock according to an embodiment of the present invention.

FIGS. 5A and 5B show an embodiment of the present invention wherein the PCC 10 comprises a dock 60 comprising the control circuitry 20 for interfacing with the remote consumer device 12 and decoder 22 for decoding the A/V files for display on the display device 16. The dock 60 further comprises an interface 62 for receiving a removable storage device 25 (e.g., a disk drive, a solid state drive, combinations of the same, or the like) that is plugged into the interface 62 as shown in FIG. 5B. The dock 60 may also comprise a suitable encryption key for binding the protected A/V files to the dock 60 (rather than to the removable storage device 25). This embodiment enables an end user to purchase the PCC 10 in the form of a dock 60 only, and then plug-in any conventional storage device 25, such as for example a My Passport™ drive available from Western Digital Technologies, Inc., the assignee of the present invention. This embodiment may also enable unlimited storage space via a collection of removable storage devices 25 any one of which may be plugged into the dock 60.

Figure 6:
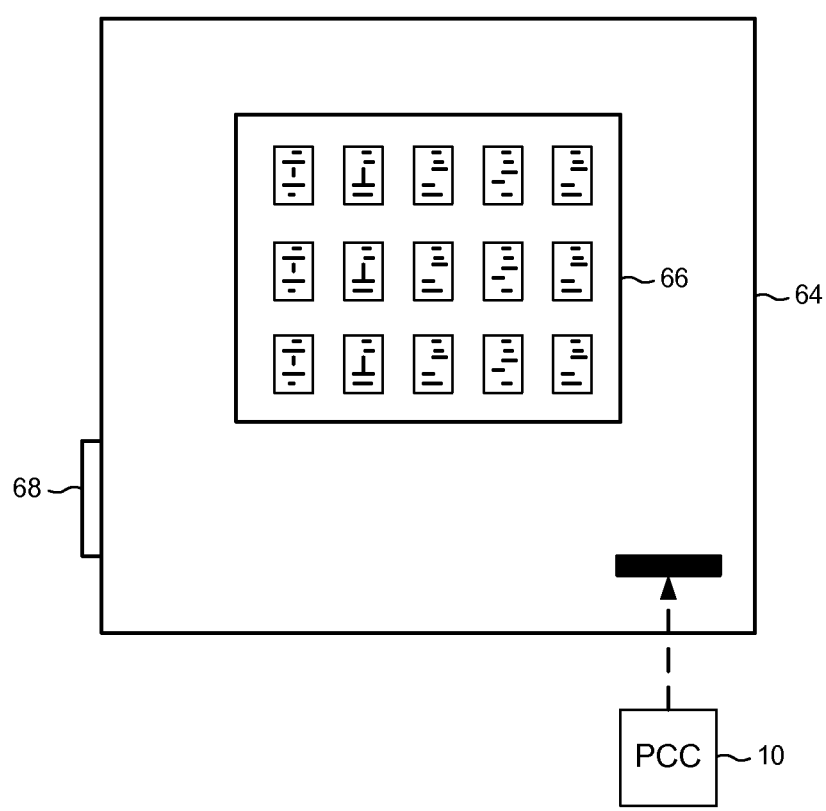
FIG. 6 shows an embodiment of the present invention wherein the PCC may be plugged into (or otherwise communicate with) a kiosk that distributes A/V files to consumers.

FIG. 6 shows an embodiment of the present invention wherein the PCC 10 may be plugged into (or otherwise communicate with) a kiosk 64 for purchasing A/V files. In one embodiment, the PCC 10 communicates with the kiosk 64 using a wired protocol (e.g., USB, Firewire, etc.) which enables fast downloads as compared to the Internet. The kiosks 64 may be located at many different convenient locations, such as inside grocery stores, banks, malls, etc. A user inserts (or connects) his or her PCC 10 to the kiosk 64 and selects an A/V file from a menu 66 (e.g., a touch screen showing a plurality of icons representing the A/V files). In one embodiment, the end user may swipe a credit card along a card reader 68 in order to purchase their selection. In an alternative embodiment, credit card information or user account information may be stored on the PCC 10 and read automatically by the kiosk 64. In the latter embodiment, the end user may enter a user name and password into the kiosk 64 to enable the kiosk 64 to access the credit card information and/or the user's account.

In one embodiment, the end user may rent an A/V file from the kiosk 64 on a daily basis (e.g., a predetermined dollar amount per day), or on a subscription basis (e.g., allowed to keep a predetermined number of A/V files for a monthly fee). The end user may "return" a rented A/V file in any suitable manner. In one embodiment, the end user may plug the PCC 10 into the same or another kiosk 64, wherein the kiosk 64 may then erase or otherwise disable the A/V file recorded on the PCC 10. In an alternative embodiment, the PCC 10 may communicate with a central server that maintains rental information for multiple kiosks and PCCs. For example, in one embodiment an end user may connect (wired or wirelessly) their PCC 10 to a computer or other consumer device that is connected to the Internet. The end user may log into the central server and then "return" a rented A/V file by having the central sever erase or otherwise disable the A/V file recorded on the PCC 10. In yet another embodiment, the end user may "return" an A/V file by deleting or otherwise disabling the A/V file from the PCC 10 themselves, or the PCC 10 may automatically delete or otherwise disable the A/V file after being viewed a predetermined number of times, or after a predetermined interval.

Although the foregoing has been described in terms of certain embodiments, other embodiments will be apparent to those of ordinary skill in the art from the disclosure herein. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

What is claimed is:

1. A media playback device comprising:
    a first interface configured to communicate with a media output device;
    a second interface configured to communicate with a data storage device, the data storage device (DSD) comprising:
        a storage medium configured to store one or more media files; and
        a decoder operable to decode a media file into an media stream;
    control circuitry configured to:
        receive information identifying the one or more media files from the DSD over the second interface;
        generate a user interface for the media output device, the user interface identifying at least one or more of the media files;
        transmit the user interface to the media output device over the first interface;
        receive a play command from a user to play a selected one of the at least one or more of the media files; and
        transmit the play command over the second interface to the DSD to stream the selected media file on the media output device, wherein the media stream from the DSD bypasses the media playback device.

2. The media playback device of claim 1, wherein the media stream from the DSD bypasses the media playback device by transmitting over a separate connection between the DSD and the media output device.

3. The media playback device of claim 2, wherein the separate connection comprises a DSD output interface.

4. The media playback device of claim 3, wherein the DSD output interface utilizes digital rights management (DRM) to encrypt content transmitted over the DSD output interface.

5. The media playback device of claim 1, wherein the control circuitry is further configured to cause the media output device to switch from receiving data from the media playback device to receiving data from the DSD.

6. The media playback device of claim 1, wherein the user interface comprises a graphical user interface (GUI).

7. The media playback device of claim 1, wherein at least one of the first and second interfaces comprises a wireless interface.

8. The media playback device of claim 1, the DSD further configured to encode the media stream into a format unrecordable by the media playback device.

9. The media playback device of claim 1, wherein media output device comprises a display.

10. The media playback device of claim 1, wherein the media stream comprises audio.

11. A method for securely playing media on a media playback device having a first interface configured to communicate with a media output device and a second interface configured to communicate with a data storage device (DSD), the method comprising:
    receive information identifying one or more media files from the DSD over the second interface;
    generate a user interface for a media output device, the user interface identifying at least one or more of the media files;
    transmit the user interface to the media output device over the first interface;
    receive a play command from a user to play a selected one of the at least one or more of the media files; and
    transmit the play command, over the second interface, to the DSD to stream the selected media file on the media output device, wherein the media stream from the DSD bypasses the media playback device.

12. The method of claim 11, wherein the media stream from the DSD bypasses the media playback device by transmitting over a separate connection between the DSD and the media output device.

13. The method of claim 12, wherein the separate connection comprises a DSD output interface.

14. The method of claim 13, wherein the DSD output interface utilizes digital rights management (DRM) to encrypt content transmitted over the DSD output interface.

15. The method of claim 11, further comprising causing the media output device to switch from receiving data from the media playback device to receiving data from the DSD.

16. The method of claim 11, wherein the user interface comprises a graphical user interface (GUI).

17. The method of claim 11, wherein at least one of the first and second interfaces comprises a wireless interface.

18. The method of claim 11, the DSD further configured to encode the media stream into a format un-recordable by the media playback device.

19. The method of claim 11, wherein media output device comprises a display.

20. The method of claim 11, wherein the media stream comprises audio.

\* \* \* \* \*